United States Patent [19]

Inoue et al.

[11] Patent Number: 4,535,458
[45] Date of Patent: Aug. 13, 1985

[54] LASER APPARATUS

[75] Inventors: Hitosi Inoue, Kanagawa; Norihiro Suenaga, Tokyo; Nobuyuki Suenaga, Kanagawa, all of Japan

[73] Assignee: Nippon Infrared Industries Co., Ltd., Tokyo, Japan

[21] Appl. No.: 373,246

[22] Filed: Apr. 29, 1982

[30] Foreign Application Priority Data

May 1, 1981 [JP] Japan .................................. 56-65241
Nov. 21, 1981 [JP] Japan ........................... 56-174008[U]

[51] Int. Cl.$^3$ .............................................. H01S 3/10
[52] U.S. Cl. ...................................... 372/25; 372/30; 372/38; 372/81; 315/224; 315/205; 315/DIG. 7
[58] Field of Search ...................... 372/25, 29, 30, 38, 372/81, 84; 315/224, 205, 307, DIG. 7

[56] References Cited

U.S. PATENT DOCUMENTS 4,240,009 12/1980 Paul ............................. 315/DIG. 7

Primary Examiner—William L. Sikes
Assistant Examiner—Léon Scotts
Attorney, Agent, or Firm—Cushman, Darby & Cushman

[57] ABSTRACT

A laser apparatus using a DC-DC converter type pulse power source generates a pulse laser output of a high peak value by utilizing the negative resistance characteristic of a laser discharge tube. The peak value, pulse width, period of the pulse output are adjustable. The apparatus is capable of producing a continuously oscillating laser light; capable of operating always with approximately maximum efficiency for any value of the laser output. The power source device for the laser apparatus permits adjustment of the pulse width and period of the pulse laser output without any adverse effect on the efficiency of the laser apparatus.

7 Claims, 13 Drawing Figures

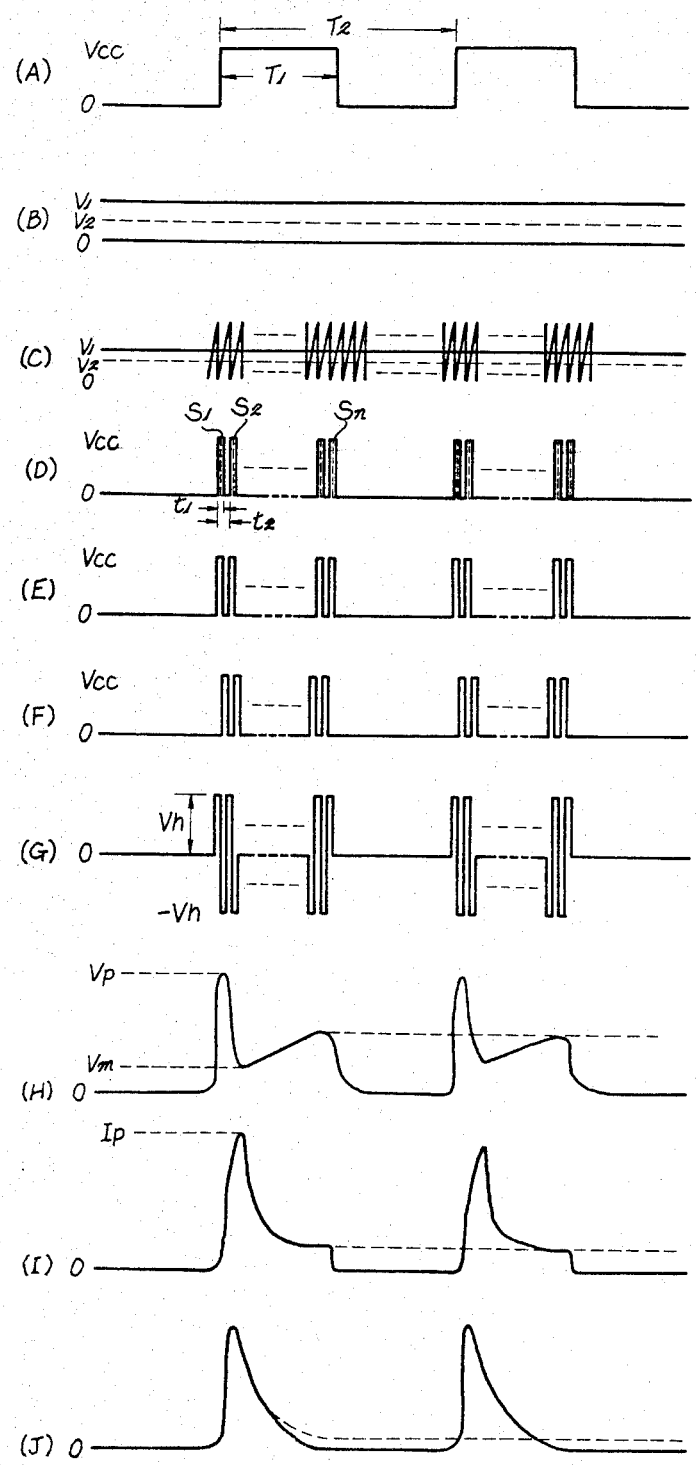

LASER APPARATUS

BACKGROUND OF THE INVENTION

1. Field of the Invention

This invention relates to a laser apparatus and more particularly to a novel pulse laser apparatus provided with a pulse power source device of the DC-DC converter type.

2. Description of the Prior Art

Generally, as well known, gas laser apparatuses are arranged for bringing about a laser oscillation by impressing a high voltage on a laser discharge tube to excite a laser medium.

For such laser apparatuses, high voltage power sources of varied types have been used. One of these types is a power source device using a DC-DC converter. In the power source device of this type, a direct current on the primary side, i.e. the low voltage side, of a high frequency transformer is switched at a high speed by a switching element to generate a high voltage on the secondary side of the transformer. Then, the current is rectified and supplied to a laser discharge tube.

A power source of this type has an advantage that it obviates the necessity of the high voltage transformer of commercial frequency and a high voltage capacitor, etc. and thus permits substantial reduction in size of the laser apparatus.

Meanwhile, however, the laser apparatus with a power source of the conventional DC-DC converter type has a disadvantage that a high peak pulse laser beam cannot be produced in a stable manner.

In order to obtain a high peak pulse laser beam, therefore, it has been necessary to have recourse to a laser apparatus of the conventionally known gain switch type.

In the above stated gain switch type, a high tension resisting large current switching element such as a thyratron which is provided on the secondary side of a high voltage transformer is arranged to switch a high voltage current at a high speed to impress thereby a pulse voltage on a laser discharge tube. This gain switch laser type arrangement, however, has been teemed with shortcomings including: The laser apparatus becomes larger in size; use of a vacuum tube element such as a thyratron or the like is indispensable, whereby resulting in a short life of the apparatus; a long period of time is required for warm-up; heater power consumption lowers the overall efficiency of the apparatus; and so on. A further shortcoming resides in that the arrangement of this type does not permit setting a high voltage current at a desired value. This causes an excessively large current to flow to the gain switch and thus results in a low efficiency.

SUMMARY OF THE INVENTION

This invention is directed to the elimination of the above-stated shortcomings of the conventional laser apparatus. It is therefore an object of the invention to provide a laser apparatus which permits reduction in size thereof with use of a pulse power source of the DC-DC converter type and, at the same time, is arranged to generate a pulse laser output of a high peak power by utilizing the negative resistance characteristic of a laser discharge tube.

It is another object of the invention to provide a laser apparatus in which the peak power of the laser output, the pulse width and generation period thereof are adjustable and controllable.

It is still another object of the invention to provide a laser apparatus which is capable of generating a continuous wave laser beam without diffuclty.

It is a further object of the invention to provide a laser apparatus which is capable of operating always with approximately maximum efficiency at any value of the laser output.

These objects, features and advantages of the invention will become apparent from the following detailed description of a preferred embodiment thereof taken in connection with the accompanying drawings.

BRIEF DESCRIPTION OF THE DRAWINGS

FIG. 2 is a wave form chart showing the action of each part of the embodiment.

DETAILED DESCRIPTION OF THE PREFERRED EMBODIMENT

Figure 1:
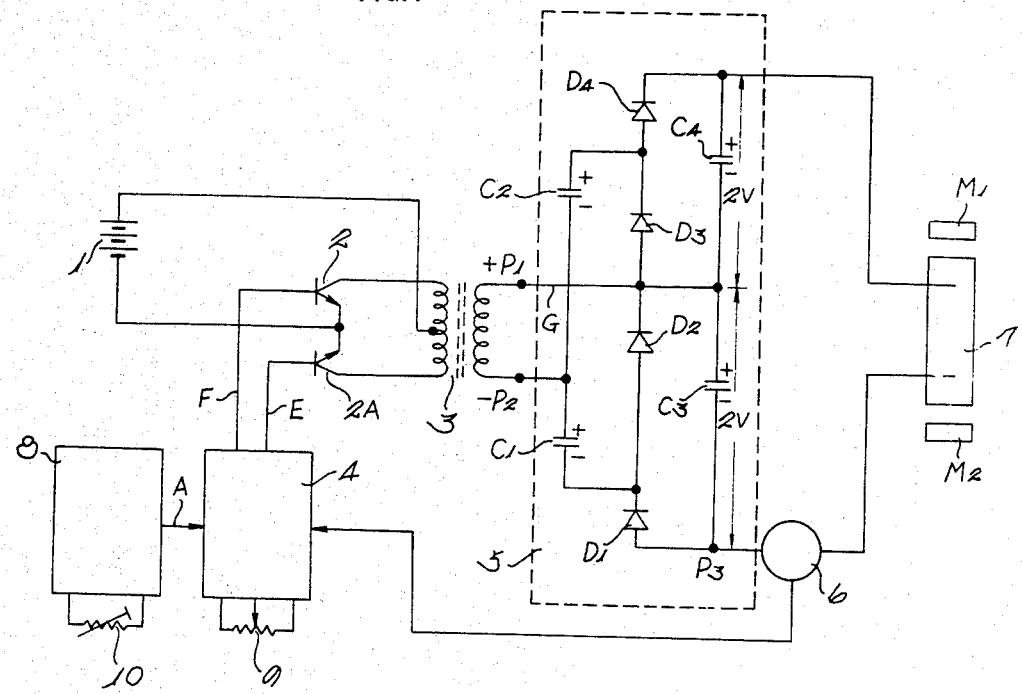
FIG. 1 is a circuit diagram showing an embodiment of the invention.

An embodiment of the present invention is as shown in a circuit diagram in FIG. 1. As shown, the embodiment has two switching transistors 2 and 2A. On the primary side of a high freqneucy transformer 3, there are connected the collectors of these switching transistors. A low voltage DC power source 1 has its terminal on the negative side thereof connected to a connection point of the emitter of each of the two transistors 2 and 2A. Meanwhile, the terminal of the power source 1 on the positive side thereof is connected to a neutral point of the primary winding of the transformer 3.

When the transistors 2 and 2A are alternately turned on, currents of different polarities flow to the coil on the primary side of the transformer 3 as will be further described hereinafter. In other words, with the above stated transistors 2 and 2A alternately switched on at a high speed, pulses of a high frequency current are generated at the coil of the secondary side of the transformer 3.

As shown by (A) in FIG. 2, a pulse oscillator 8 generates repetitive pulses of pulse width T1 at cyclic periods T2 (hereinafter will be called drive pulses). The pulses are supplied to a base current drive circuit 4. The pulse width T1 of the drive pulses is adjustable to a desired length by means of a variable resistor 10. The period T2 is also adjustable by some suitable means.

Meanwhile, an n number of switching pulses S1-Sn are produced at pulse width t1 and at periods t2 ($T1 \geq t2$) only when the above stated drive pulses are on. Referring to (D) in FIG. 2, the switching pulses represent a pulse train consisting of the n number of pulses S1-Sn which are kept oscillated over a period of time T1 to be intermittently produced at periods T2.

The switching pulses are adjusted to pulses of two phases which differ 180° from each other as shown by (E) and (F) in FIG. 2 and are then supplied to the base of each of the transistors 2 and 2A. With the switching pulses thus supplied, a pulse like high frequency current is generated at the primary coil of the high frequency transformer 3. This pulse like current causes a high frequency voltage which is boosted as many times as a turn ratio to be produced on the secondary side of the high frequency transformer 3. The pulse width of the switching pulses are adjustable by means of a variable resistor 9.

On the secondary side of the high frequency transformer 3, there is provided a voltage multiplier circuit 5 comprising a plurality of capacitors and diodes. In this particular embodiment example, this voltage multiplier 5 comprises four capacitors C1–C4 and four diodes D1–D4 and is arranged to serve as full-wave voltage quadrupling circuit.

Figure 3:
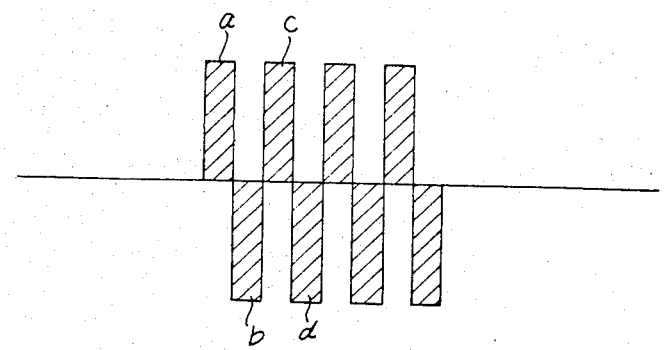
FIG. 3 is a wave form chart showing a voltage multiplying and rectifying action.

When the high frequency pulse voltage on the secondary side of the above-stated high frequency transformer 3 (the wave form of which is as shown in FIG. 3) is supplied to the voltage quadrupling circuit shown in FIG. 1, at the first positive half wave shown by a reference symbol a in FIG. 3, the terminal P1 on the secondary side of the transformer becomes positive to cause the current to flow to the diode D3 and capacitor C2. Then, the capacitor C2 is charged to the polarity indicated in the drawing.

Then, at the first negative half wave shown by a reference symbol b in FIG. 3, the terminal P2 becomes positive to cause the current to flow to the capacitor C1 and the diode D2 and then to come back to the transformer. At this point of time, the capacitor C1 is charged to the polarity as shown in the drawing. Following that, when the second positive half wave indicated by a reference symbol c in FIG. 3 is supplied, the terminal P1 again becomes positive to cause a potential difference V to appear between the terminals P1 and P2. Since, at this point of time, the potential difference V has already appeared to the polarity as shown at the capacitor C1, there takes place a potential difference 2 V between the terminals P1 and P3. In other words, the capacitor C3 is then charged with the potential difference of 2 V to the polarity shown in the drawing.

Lastly, when the second negative half wave indicated by a symbol d in FIG. 3 is supplied, the terminal P2 again becomes positive. Then, when the current flows through the capacitor C2 and the diode D4, there appears a voltage of 2 V on the output side of the capacitor C2 and the capacitor C4 is charged with the potential difference of 2 V to the polarity as shown.

In this manner, there is produced a DC voltage of 4 V at the output terminal of the voltage multiplier circuit shown in FIG. 1. Assuming that an m times voltage multiplier circuit is used and that the output voltage of the secondary side coil of the high frequency transformer 3 is Vh, there will generally be obtained an output DC voltage Vo of a value mVh as will be apparent to those skilled in the art.

To the output terminal of the voltage multiplier circuit 5, is directly connected a laser discharge tube 7 without having any ballast resistance interposed between them. Therefore, when the laser discharge tube 7 is in a non-discharging state, a DC voltage of $Vo = 4Vh$ is impressed thereon. It goes without saying here that the impressed voltage is set at a value larger than a discharge starting voltage Vp.

At the both ends of the laser discharge tube 7, there provided two reflecting mirrors M1 and M2 which are arranged to form a laser resonator. This laser resonator is, for example, a known $CO_2$ laser resonator.

In the drawing, a reference numeral 6 indicates a current detector arranged to detect the mean value of the tube current of the laser discharge tube 7. The current detector 6 supplies a detection signal to the above-stated base current drive circuit 4. At the circuit 4, the pulse width of the switching pulses is adjusted in accordance with variation in the detection signal and the tube current is controlled and stabilized thereby. Further, in adjusting the pulse width of the switching pulses by adjusting the variable resistor 9, the detection signal is used as reference.

Figure 4:
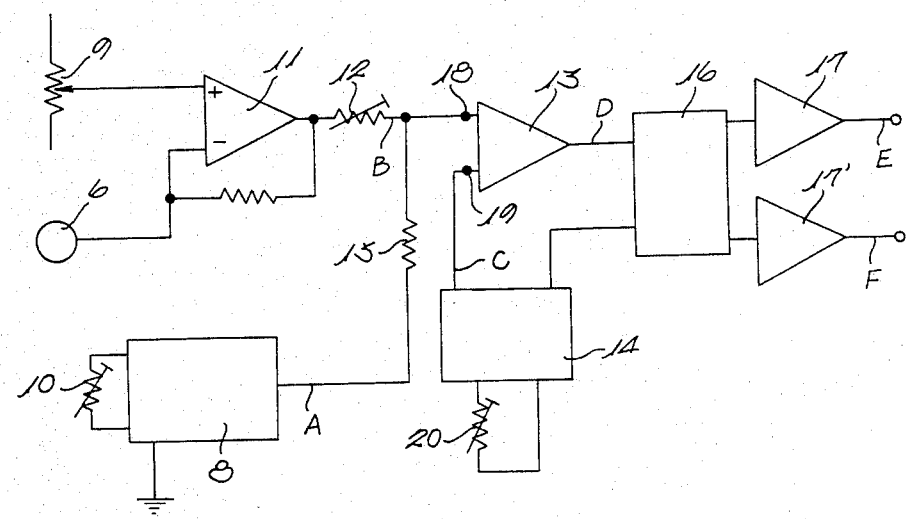
FIG. 4 is a circuit diagram showing a base current drive circuit shown in FIG. 1.

Next, the base current drive circuit 4 will be described in more detail with reference to FIG. 4.

As shown, the drive pulses produced from the pulse oscillator 8 is supplied to one input terminal 18 of a comparator 13 through a resistor 15. Signals from the variable resistor 9 and the current detector 6 are respectively supplied to an error amplifier 11, which then produces a differentially amplified output signal. This signal is adjusted to a suitable size by means of a variable resistor 12 before it is supplied to the input terminal 18 of the above-stated comparator 13.

Meanwhile, a desired triangular wave signal is produced at predetermined periods t2 from a triangular wave generator 14 and is supplied to the other input terminal 19 of the above-stated comparator 13. The period of the triangular wave signal is rendered variable and adjustable by a variable resistor 20. At the comparator 13, the signals received through the input terminals 18 and 19 are compared with each other to determine an output signal.

In other words, the triangular wave signal is supplied to the terminal 19 at periods t2 while another signal determined by the error amplifier 11, variable resistor 12, above-stated drive pulses, etc. is supplied to the terminal 18 and these two signals are compared with each other. With the two signals compared at the comparator 13, there are produced switching pulses of pulse width t1 at periods t2. This pulse width of the switching pulses is determined by a signal voltage supplied to the input terminal 18. In other words, the pulse width is adjustable by adjusting the above-stated variable resistor 9. Since the terminal 18 is having the drive pulses of pulse width T1 and period T2 supplied thereto, the switching pulses produced from the comparator 13 form a pulse train intermittently producing at periods T2.

The switching pulses produced from the comparator 13 are supplied to a logic circuit 16, where these pulses are adjusted into two-phase switching pulses differing in phase from each other. These switching pulses are respectively amplified by amplifiers 17 and 17′ and perform alternate switching actions on transistors 2 and 2A.

Referring now to FIG. 2, further details of the operation of the embodiment are as follows: As shown by (A) in FIG. 2, the drive pulses of pulse width T1 and period T2 are produced from the pulse oscillator 8. As mentioned in the foregoing, the drive pulses are supplied to one terminal 18 of the comparator 13.

Further, the signal which is obtained by differentially amplifying the signals from the variable resistor 9 and the current detector 6 by the error amplifier 11, shown by (B) in FIG. 2, is also supplied to the terminal 18. Here, with the variable resistor 9 adjusted, the value of the output signal can be continuously changed. In FIG. 2 (B), the full line indicated by V1 represents a state of high voltage value while a broken line V2 represents a state of low voltage value. In the case of the tube current, variation takes place also in the same manner.

A triangular wave signal shown by (C) in FIG. 2 is produced from the triangular wave generator 14. This signal is repeated at periods t2 as mentioned in the foregoing and is supplied to the other terminal 19 of the above-stated comparator 13.

The above-stated two signals are compared with each other at the comparator 13 and resultant switching pulses as shown by (D) in FIG. 2 are produced therefrom. In other words, an n number of switching pulses S1-Sn of pulse width t1 and period t2 are produced only when the drive pulses are produced. It goes without saying that the pulse train consisting of the switching pulses S1-Sn is intermittently produced at the cyclic period T2. Here, the pulse width of the switching pulses can be adjusted by adjusting the variable resistor 9. For example, the switching pulses are represented by the full line when the voltage of the signal of (B) in FIG. 2 is V1 and by the broken line when the voltage is V2. Further, the period of the switching pulses produced from the comparator 13 is variable and controllable by means of this variable resistor 20 being adjusted. The switching pulses produced from the comparator 13 is supplied to the logic circuit 16. At the logic circuit 16, the switching pulses are made into two-phase pulses differing from each other in phase as mentioned in the foregoing. Then, they are respectively amplified by the amplifiers 17 and 17'.

Then, the switching pulses are supplied to the bases of the transistors 2 and 2A respectively. As mentioned in the foregoing, the switching pulses S1-Sn are produced from the base current driving circuit 4.

With the switching pulses supplied, the transistors 2 and 2A begin to alternately effect switching. As a result of this switching action, pulses of a high frequency current alternately inverting the polarity thereof are supplied to the primary coil of the high frequency transformer 3. The pulses are boosted as many times as the turn ratio and thus transmitted to the secondary side of the transformer 3 and then become an n number of high frequency voltage pulses of pulse voltage Vh as shown by (G) in FIG. 2.

Since the above-stated high frequency voltage pulses are generated in accordance with the above-stated switching pulses, the high frequency voltage pulses are of pulse width t1 and period t2. They are of course produced in synchronism with the above-stated drive pulses.

As will be apparent from the foregoing description, at the voltage multiplier circuit 5, one capacitor is charged in every ½ period of the high frequency pulses. In case where the voltage multiplier circuit is an m times voltage multiplying circuit consisting of an m number of capacitors, a charging process for all these capacitors is completed in a period of time m·t2/2. In other words, the DC voltage $Vo=mVh$ can be impressed on the laser discharge tube 7 within a period of time m·t2/2.

In this instance, the number n of the high frequency pulses to be included in one pulse train must be set at a value more than a number that is sufficient for charging every capacitor of the voltage multiplier circuit 5. In other words, a pulse train must be consisted of more than a m/2 number of high frequency pulses. Meanwhile, the voltage mVh to be impressed on the laser discharge tube 7 is set at a value higher than the discharge starting voltage Vp.

It is well known that the laser discharge tube 7 is a sort of discharge tube and thus shows a negative resistance. Once the discharge begins in response to the discharge starting voltage Vp, therefore, the tube voltage comes to decrease according as the tube current increases.

In other words, the impedance of the discharge tube drops according as the tube current increases. Further, when the tube current increases, glow discharge changes into arc discharge through abnormal glow discharge. Under the abnormal glow discharge condition, the discharge tube, as it is known, shows a positive resistance characteristic. When the output DC voltage Vo of the above-stated multiplier circuit is impressed on the laser discharge tube 7 which has such a characteristic, the discharge tube behaves as follows:

As mentioned in the foregoing, one capacitor is charged during the ½ period of the high frequency pulses. In that instance, the time constant $\tau$ of the circuit in its charged state is C·Zs (wherein Zs represents the internal impedance of the transformer). Therefore, the discharge starting voltage Vp is reached after approximately $t_s = (m-1)\cdot t_2/2 + CZs ln(Vp / Vh + 1)$. Since this process takes place under a no-load condition, the rise of the voltage Vo is very steep as shown by (H) in FIG. 2.

Next, referring to (I) of FIG. 2, the tube current It is described as follows: An electric discharge begins when the output voltage Vo of the voltage multiplier circuit reaches a discharge starting voltage Vp. Then, since the internal impedance of the laser discharge tube decreases with the increase in the tube current It as mentioned in the foregoing, the tube current It further rapidly increases.

The increase in the tube current brings about further decrease of the impedance and then this causes further increase of the tube current It. Since the high frequency pulses are being sequentially produced as shown by (G) in FIG. 2, the voltage Vb impressed on the laser discharge tube drops to a relatively less degree. Meanwhile, the tube current It rises to a very great extent as shown by (I) in FIG. 2.

The tube current It thus acceleratedly increases due to a sort of positive feedback phenomenon. However, in the meantime, since the voltage Vo is continuously dropping according as the tube current It increases as shown by (H) in FIG. 2, the tube current It is unable to retain the initial rate of increase thereof and becomes saturate at a certain point.

This gives a peak current value Ip. In other words, the peak current value Ip is determined according to the difference between the discharge starting voltage Vp and a minimum voltage value Vm.

After that, the voltage Vo again begins to gradually rise while the current It begins to drop accordingly. If the voltage Vo decreases to a value below a discharge maintaining voltage value, the discharge discontinues and the current returns to zero. In the case of the present invention, however, the various constants of circuit are selected in such a manner that the above-stated impressed voltage Vo never comes to drop below the discharge maintaining voltage as long as the high frequency pulses are being produced.

When all of the n number of high frequency pulses have been produced, the DC output voltage Vo suddenly drops and the current It becomes zero accordingly. During the process mentioned above, one pulse like current is supplied to the laser discharge tube. Then, when another switching pulse train is produced from the drive circuit 4, the process is again repeated in exactly the same manner as described in the foregoing.

A laser output beam is produced in accordance with the tube current. However, since it is affected by the moderating effect, it becomes a pulse beam as shown by (J) in FIG. 2. It goes without saying that the pulse width of the pulse laser beam is determined by the pulse width of the drive pulses mentioned in the foregoing.

As it will readily be appreciated, arrangement to have a DC voltage (i.e. drive pulses of extremely long pulse width) produced from the pulse oscillator 8 will give a continuous wave output as represented by a broken line in FIG. 2.

In the arrangement described in the foregoing, the tube current It is unconditionally determined by the working impedance Zt of the laser discharge tube 7, the discharge starting voltage Vp, the pulse width t1 of the high frequency pulses, the period t2 of the pulses, etc.

Among these factors, the pulse width t1 and the period t2 are easily controllable from outside. However, adjustment of the period t2 results in a change of the characteristics of the apparatus and, therefore, is not desirable. In view of this, it is preferable to adjust the pulse width t1 of the switching pulses by adjusting the variable resistor 9. This changes the pulse width t1 of the high frequency pulses whereby resulting in a change of the amount of the electric charge of the voltage multiplier, so that the decreasing rate of the DC output voltage Vo can be changed. Accordingly, the peak current value Ip of the current flowing to the laser discharge tube 7 varies so that the laser output power can be changed accordingly.

As well known, in a gas laser apparatus, the working region thereof must always be kept in a glow discharge state. Generally, the transition from glow discharge to arc discharge varies with:

(1) The shape of the discharge tube
(2) The electrode material of the discharge tube
(3) Medium gas pressure within the discharge tube
(4) The kind of the medium gas within the discharge tube
(5) The internal impedance of an exciting source
(6) The size of the tube current of the discharge tube
(7) The period during which the tube current flow of the discharge tube continues Among these factors, the factors that can be controlled from the exciting source of the discharge tube are factors (5) through (7). In order to inhibit the transition to the arc discharge, therefore, various conditions such as the voltage multiplier circuit 5 and the secondary winding voltage Vh of the high frequency transformer 3, etc. must be determined in relation to the laser discharge tube 7.

As will be apparent to those skilled in the art, setting the secondary winding voltage Vh at a high value permits to produce a voltage higher than the discharge starting voltage Vp and thereby to cause the discharge tube to discharge even where the number of multiplying steps of the voltage multiplier circuit 5 is not large. However, in cases where the voltage multiplier circuit is arranged to have only a few multiplying steps while the secondary winding voltage Vh is set at a high value, after the laser discharge tube has begun to discharge by the output voltage Vh which is produced on said secondary winding coil, a current tends to be supplied directly to the laser discharge tube without charging the capacitors as has been experienced in the past. Through experiments, the present inventors have found that this phenomenon more saliently takes place where the number of the voltage multiplying steps does not exceed two. When such a phenomenon takes place, transition from glow discharge to arc discharge very rapidly takes place. There are two conceivable causes for this:

(1) Since the voltage multiplier circuit 5 at the time of charge/discharge can be considered to be equivalent to a series connected arrangement of a plurality of capacitors, the impedance as viewed from the discharge tube 7 toward the power source (i.e. power source impedance) is dependent on the number of the capacitors or the number of the voltage multiplying steps. Therefore, this power source impedance becomes smaller according as the number of the voltage multiplying steps decreases and also according as the capacity of the capacitors increases.

(2) In the discharge circuit, it is necessary that the power source impedance as viewed from the discharge tube is large and the voltage-to-current relation has a constant current limiting characteristic. Reduction in the number of the voltage multiplying steps to a number less than a certain number renders the power source impedance too small for obtaining the required characteristic mentioned above.

It has been discovered through the results of experiments as well as the above-mentioned consideration that, in the circuit arrangement as shown in FIG. 1, the voltage multiplier circuit must have at least three voltage multiplying steps for obtaining stable glow discharge.

However, in cases where the number of voltage multiplying steps is 10 or thereabout, a loss due to overlapping of capacitors, diodes, etc. becomes great. Therefore, with the safety factor of the glow discharge also taken into consideration, the number of voltage multiplying steps is preferably set at 4 to 8 steps.

Assuming that the working voltage of the laser discharge tube 7 is Vd, if the voltage Vh of the secondary winding of the transformer 3 is relatively close to the working voltage Vd, the secondary winding current also flows directly to the laser discharge tube 7 in the same manner as in the above-stated case. When the secondary winding voltage Vh becomes higher than $\frac{1}{2}$ of the working voltage Vd or thereabout, this phenomenon saliently appears to cause transition to the arc discharge.

To avoid this phenomenon, therefore, the secondary winding voltage Vh must be set at a value not exceeding $\frac{1}{2}$ of the working voltage Vd of the laser discharge tube 7. However, if the secondary winding voltage is set at an excessively low value, a constant output might become hardly obtainable in obtaining a continuous wave output though it depends on the capacity of the capacitors. Taking the safety factor of the glow discharge also into consideration, therefore, the secondary winding voltage Vh is preferably set at a value between $\frac{1}{3}$ and $\frac{1}{4}$ of the working voltage Vd or thereabout.

The capacity C of the capacitors of the voltage multiplier circuit 5 is set at such a value that results in a desired value of the current carrying capacity of the apparatus and that of the impedance of the power source.

While the voltage multiplier circuit 5 employed in the above-described embodiment is of the full-wave rectifying type, it is of course allowable to replace it with a voltage multiplier circuit of the half-wave rectifying type though the latter results in a somewhat lower efficiency.

As apparent from the foregoing description, the laser apparatus according to the present invention is characterized by the following points:

(1) A pulse train consisting of an n number of high frequency pulses is intermittently produced and boosted and rectified through a voltage multiplier circuit before they are directly impressed on the laser tube.

(2) The negative resistance characteristic of the laser tube is utilized to obtain a high peak pulse laser beam.

(3) Stable glow discharge can be obtained by arranging the voltage multiplier circuit to have at least three voltage multiplying steps and by setting the secondary winding voltage Vh of the high frequency transformer at a value not exceeding ½ or thereabout of the working voltage Vd of the laser tube.

(4) The pulse width of the pulse laser beam is adjustable by adjusting the duration time or duty of the pulse train consisting of the high frequency pulses. Further, the peak power of the pulse laser beam is adjustable and controllable by varying the pulse width of the high frequency pulses.

In accordance with the present invention, a laser apparatus of simple construction which not only is capable of producing a high peak pulse laser beam but also readily permits easy adjustment of the peak power, pulse width, etc. Besides, the apparatus according to the invention is capable of giving a continuous wave laser beam. Further, in accordance with the invention, the apparatus can be operated at a value close to a discharge current value where approximately maximum efficiency of the laser tube is obtainable throughout an operating range from the low output condition to the maximum output condition thereof.

What is claimed is:

1. A laser apparatus comprising:
    a pulse power source which intermittently produces a pulse train consisting of a plurality of successive high frequency pulses;
    an m times voltage multiplier circuit which boosts the voltage value of the high frequency pulses produced from said pulse power source m times as many as the value and rectifies the high frequency pulses; and
    a laser discharge tube directly connected to the DC output terminal of said m times voltage multiplier circuit,
    the number m of the voltage multiplying steps of said voltage multiplier circuit being at least 3 and the voltage value of said high frequency pulses not exceeding about ½ of the working voltage of said laser discharge tube,
    said pulse power source including means for adjusting the pulse width of an output laser beam by varying the number of the high frequency pulses included in said train of successive high frequency pulses.

2. A laser apparatus according to claim 1 further including means for varying the pulse width of said high frequency pulses.

3. A laser apparatus comprising:
    a pulse power source which intermittently produces a pulse train consisting of a plurality of successive high frequency pulses;
    an m times voltage multiplier circuit which boosts the voltage value of the high frequency pulses produced from said pulse power source m times as many as the value and rectifies the high frequency pulses; and
    a laser discharge tube directly connected to the DC output terminal of said m times voltage multiplier circuit,
    the number m of the voltage multiplying steps of said voltage multiplier circuit being at least 3 and the voltage value of said high frequency pulses not exceeding about ½ of the working voltage of said laser discharge tube,
    said pulse power source including means for adjusting the pulse period of an output laser beam by varying the generating period of a pulse train consisting of the high frequency pulses.

4. A laser apparatus comprising:
    a pulse power source which intermittently produces a pulse train consisting of a plurality of successive high frequency pulses, the pulse power source including a transformer and means for successively switching the direct current of relatively low voltage at high speed on a primary side of the transformer which generates a high voltage, and said successively switching action is intermittently performed;
    an m times voltage multiplier circuit which boosts the voltage value of the high frequency pulses produced from said pulse power source m times as many as the value and rectifies the high frequency pulses; and
    a laser discharge tube directly connected to the DC output terminal of said m times voltage multiplier circuit,
    the number m of the voltage multiplying steps of said voltage multiplier circuit being at least 3 and the voltage value of said high frequency pulses not exceeding about ½ of the working voltage of said laser discharge tube.

5. A laser apparatus according to claim 4, wherein the pulse width of said high frequency pulse, the number of high frequency pulse included in said pulse train, and the generating period of the pulse train, are arranged to be varied by adjusting the switching action to switch said direct current.

6. A laser apparatus according to claim 1, 3 or 4, wherein the pulse power source comprising:
    a high frequency transformer;
    a DC power source of relatively low voltage;
    a switching element arranged to switch a direct current supplied from said power source and to supply said current to the primary coil of said high frequency transformer;
    a base current driving circuit for generating a switching pulse to drive the switching element; and
    a pulse oscillator,
    said base current driving circuit having means for varying the switching pulse width, whereby the switching pulses are intermittently output as a pulse train of plural successive pulses in synchronism with the drive pulses of desired width and period generated from the pulse oscillator.

7. A laser apparatus according to claim 6, wherein the switching pulses generated from said base current driving circuit are arranged into two-phase switching pulses differing in phase from each other, whereby the switching pulses alternately perform two switching elements.

* * * * *